Aug. 21, 1945.  C. E. FREDERICKSON  2,383,184
TRACTION WHEEL AND CHAIN
Filed Sept. 1, 1943  2 Sheets-Sheet 1

Inventor
Clayton E. Frederickson
By Albert E. Dieterich
Attorney

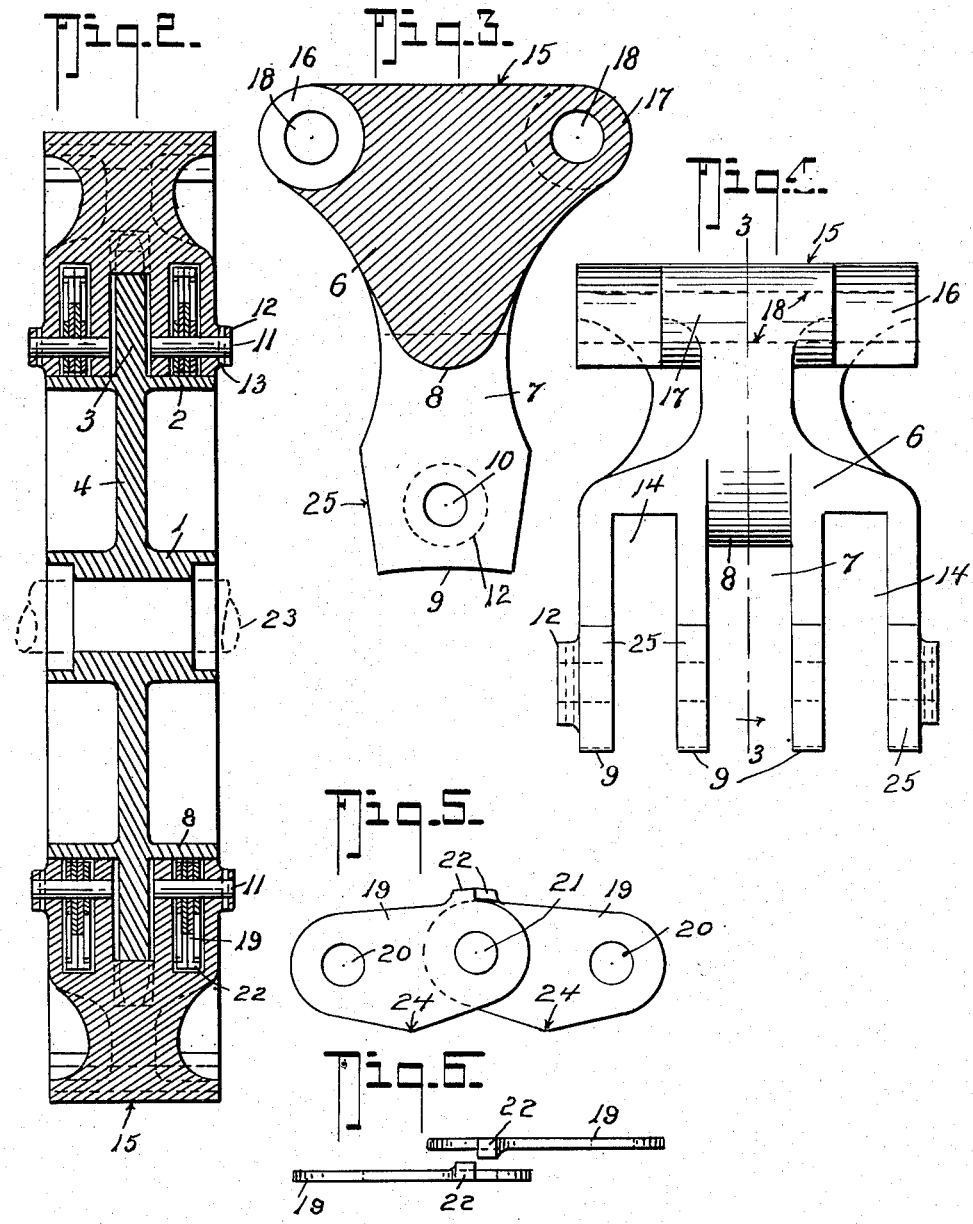

Patented Aug. 21, 1945

2,383,184

UNITED STATES PATENT OFFICE 2,383,184

TRACTION WHEEL AND CHAIN

Clayton Erasmus Frederickson, Chicago, Ill.

Application September 1, 1943, Serial No. 500,827

15 Claims. (Cl. 305—10)

My invention relates to traction wheels and chains of the type shown in my Letters Patent No. 1,687,834, issued October 16, 1928, and the invention seeks to improve the wheel and chain of that patent in a manner whereby its effectiveness is increased and its cost of manufacture and maintenance is reduced.

A further object is to provide means whereby the cam-links will break more easily in passing around the wheel.

Other objects are; to provide a traction chain with a double set of cam links, one set at either side of the center plane of the wheel; to provide for the bearing of the traction links or pads at their inner ends on a rim of the wheel; and to provide the tractor links with walls which will abut one another along radii of the wheel as the chain passes around the wheel and thereby add to the rigidity of the parts engaged with the wheel and prevent rattling or chattering of the chain.

Other objects of the invention will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 2 is a vertical section on the line 2—2 of Fig. 1.

Fig. 3 is an enlarged vertical section on the line 3—3 of Fig. 4.

Fig. 4 is an elevation of a traction link per se.

Fig. 5 is an enlarged side elevation of a pair of cam-links connected together.

Fig. 6 is a top plan view of the links shown in Fig. 5.

Figure 1:
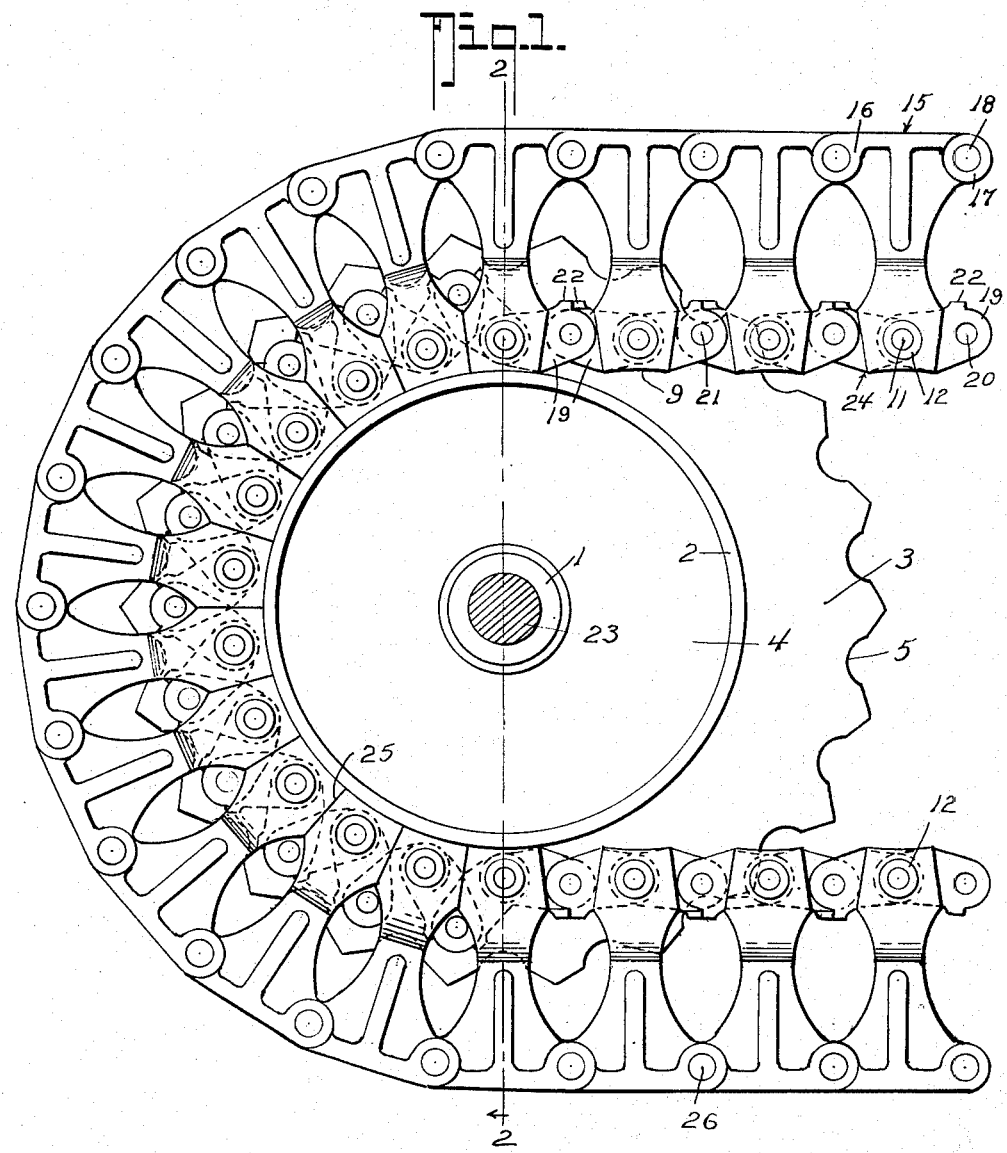
Fig. 1 is a side elevation of a portion of a traction chain and a wheel around which the chain passes.

In the drawings, in which like parts bear the same reference characters, 1 represents the hub of a wheel having a rim connected to the hub by a central web 4, the web 4 being extended beyond the rim 2 to comprise a sprocket extension 3 whose periphery has recesses or pockets 5 to receive the bearing portions 8 of the traction links or pads 6.

Each traction link or pad 6 comprises a body having a tread face 15, a pair of spaced ears 16, a single ear 17, holes 18 for hinge pins 26, a slot 7 to straddle the sprocket-flange 3 of the wheel 1, a bearing surface 8 to fit the sprocket recesses 5, two side slots 14 to receive the cam-links 19, bosses 12 and holes 10 to receive the pivot pins 11 which connect the links 19 to the pads 6, arcuate bearing faces or seats 9 curved concentrically with the curvature of the wheel-rim 2, and the front and back contacting faces 25 which lie along radii of the wheel.

The bosses 12 may also be provided with cross holes for key pins 13, if desired.

Each link 19 has a pair of pin holes 20 to receive the pivot pins 11 and 21, respectively. Each link also has a lug 22 to lie over the adjacent link at the outer edge of the link, and a cam portion 24 at the inner edge of the link. The construction of the links 19 and their stop lugs 22 is such as to provide, with the pivots 21, rule joints that are so arranged that when the links are in longitudinal alignment the axes of the pivots 21 will lie outside a line joining the axes of the pivots 11. In this way the links 19, when contacting the wheel rim 2, will break easily and all tendency to jam will be avoided.

The usual drive shaft 23 for the wheel is shown in cross section in Fig. 1 and in dotted lines in Fig. 2, and constitutes no part of the present invention.

Two cam tie-chains of four cam links thick are employed, one chain running at either side of the central longitudinal plane of the traction wheel and chain as a whole.

By my present construction only single driving wheels at each extremity of the traction chain are required instead of two wheels at each end, as shown in Fig. 1 of my patent aforesaid; further, a triple bearing of each traction link on the wheel is obtained, i. e., two bearings on the seats 9, one at either side of the flange 3, and the third on the periphery of that flange (see Fig. 2).

From the foregoing description, taken in connection with the accompanying drawings, it is thought that the complete construction, operation and advantages of my improvements will be clear to those skilled in the art to which it appertains.

What I claim is:

1. In traction wheels and chains wherein an endless chain of traction links, connected by chains of links, passes around drive wheels: the improvement which comprises the provision of rule-jointed cam links between each two traction links, the cam portions of the cam links functioning to engage the rims of the traction wheels as the chains pass around the traction wheels thereby to break the rule joints as the traction links approach the turn around the traction wheels.

2. In traction wheels and chains wherein an endless chain of traction links, connected by chains of links, passes around drive wheels: the improvement which includes a traction wheel having a hub and a rim and a sprocket web projecting outwardly from the rim, and traction links slotted to straddle said sprocket web and having driving connection with the same.

3. In traction wheels and chains wherein an endless chain of traction links, connected by chains of links, passes around drive wheels: the improvement which includes a traction wheel having a hub and a rim and a sprocket web projecting outwardly from the rim, and traction pads or links slotted to straddle said sprocket web and having driving connection with the same, said traction links having end seats to bear on said rim.

4. In traction wheels and chains wherein an endless chain of traction links, connected by chains of links, passes around drive wheels: the improvement which includes a traction wheel having a hub and a sprocket web projecting outwardly from the rim, and traction pads or links slotted to straddle said sprocket web and having driving connection with the same, said traction links having front and back faces disposed along radii of the wheel.

5. In traction wheels and chains wherein an endless chain of traction links, connected by chains of links, passes around drive wheels: the improvement which includes a traction wheel having a hub and a rim and a sprocket web projecting outwardly from the rim, and traction links slotted to straddle said sprocket web and having driving connection with the same, said traction links having end seats to bear on said rim, said traction links having front and back faces disposed along radii of the wheel.

6. In traction wheels and chains wherein an endless chain of traction links or pads, connected by chains of cam links, passes around drive wheels: the improvement which includes a traction wheel having a hub and a rim and a sprocket web projecting outwardly from the rim, and traction pads or links slotted to straddle said sprocket web and having driving connection with the same, said traction links or pads having side slots to receive a cam-link chain at either side of the traction links or pads.

7. In traction wheels and chains wherein an endless chain of traction links or pads, connected by chains of cam links, passes around drive wheels: the improvement which includes a traction wheel having a hub and a rim and a sprocket web projecting outwardly from the rim, and traction pads or links slotted to straddle said sprocket web and having driving connection with the same, said traction links or pads having end seats to bear on said rim, said traction links or pads having side slots to receive a cam-link chain at either side of the traction links or pads.

8. In traction wheels and chains wherein an endless chain of traction links or pads, connected by chains of cam links, passes around drive wheels: the improvement which includes a traction wheel having a hub and a rim, and a sprocket web projecting outwardly from the rim, and traction pads or links slotted to straddle said sprocket web and having driving connection with the same, said traction links or pads having front and back faces disposed along the radii of the wheel, said traction links or pads having side slots to receive a cam-link chain at either side of the traction links or pads.

9. In traction wheels and chains wherein an endless chain of traction links or pads, connected by chains of cam links, passes around drive wheels: the improvement which includes a traction wheel having a hub and a rim and a sprocket web projecting outwardly from the rim, and traction pads or links slotted to straddle said sprocket web and having driving connection with the same, said traction links or pads having end seats to bear on said rim, said traction links or pads having front and back faces disposed along radii of the wheel, said traction links or pads having side slots to receive a cam-link chain at either side of the traction links or pads.

10. In a traction wheel and chain drive: a wheel having a hub and a rim, and a sprocket web projecting outwardly from the rim; an endless chain of traction links or pads pivoted together adjacent their tread faces, each link or pad being furcated to provide a center and two side slots adjacent their inner ends, and having a sprocket-engaging bearing surface; and two chains of cam links pivoted together and to said traction links or pads and lying one in each side slot of said traction links or pads.

11. In a traction wheel and chain drive: a wheel having a hub and a rim, and a sprocket web projecting outwardly from the rim; an endless chain of traction links or pads pivoted together adjacent their tread faces, each link or pad being furcated to provide a center and two side slots adjacent their inner ends, and having a sprocket engaging bearing surface; and two chains of cam links pivoted together and to said traction links or pads, the traction links or pads having pad seats conforming to the wheel rim.

12. In a traction wheel and chain drive: a wheel having a hub and a rim, and a sprocket web projecting outwardly from the rim; an endless chain of traction links or pads pivoted together adjacent their tread faces, each link or pad being furcated to provide a center and two side slots adjacent their inner ends, and having a sprocket-engaging bearing surface; and two chains of cam links pivoted together and to said traction links or pads and lying one in each side slot of said traction links or pads, said traction links or pads having faces for contacting along radii of said wheel.

13. In a traction wheel and chain drive: a wheel having a hub and a rim, and a sprocket web projecting outwardly from the rim; an endless chain of traction links or pads pivoted together adjacent their tread faces, each link or pad being furcated to provide a center and two side slots adjacent their inner ends, and having a sprocket-engaging bearing surface; and two chains of cam links pivoted together and to said traction links or pads and lying one in each side slot of said traction links or pads, said cam links between adjacent traction links or pads being rule jointed with the axis of the rule joint offset outwardly from the pivots of the traction links or pads.

14. In a traction wheel and chain drive: a wheel having a hub and a rim, and a sprocket web projecting outwardly from the rim; an endless chain of traction links or pads pivoted together adjacent their tread faces, each link or pad being furcated to provide a center and two side slots adjacent their inner ends, and having a sprocket-engaging bearing surface; and two chains of cam links pivoted together and to said traction links or pads and lying one in each side slot of said traction links or pads, said traction links or pads having faces for contacting along radii of said wheel, the traction links or pads having pad seats conforming to the wheel rim.

15. In a traction wheel and chain drive: a wheel having a hub and a rim, and a sprocket web projecting outwardly from the rim; an endless chain of traction links or pads pivoted together adjacent their tread faces, each link or pad being furcated to provide a center and two side slots adjacent their inner ends, and having a sprocket-engaging bearing surface; and two chains of cam links pivoted together and to said traction links or pads and lying one in each side slot of said traction links or pads, said traction links or pads having faces for contacting along radii of said wheel, the traction links or pads having pad seats conforming to the wheel rim, said cam links between adjacent traction links or pads being rule jointed with the axis of the rule joint offset outwardly from the pivots of the traction links or pads.

CLAYTON ERASMUS FREDERICKSON.